US012469966B2

(12) United States Patent
Chen

(10) Patent No.: US 12,469,966 B2
(45) Date of Patent: Nov. 11, 2025

(54) ANTENNA DEVICE

(71) Applicant: PanelSemi Corporation, New Taipei (TW)

(72) Inventor: Hsien-Te Chen, Taipei (TW)

(73) Assignee: PANELSEMI CORPORATION, New Taipei (TW)

( * ) Notice: Subject to any disclaimer, the term of this patent is extended or adjusted under 35 U.S.C. 154(b) by 342 days.

(21) Appl. No.: 18/339,322

(22) Filed: Jun. 22, 2023

(65) Prior Publication Data

US 2023/0420844 A1 Dec. 28, 2023

(30) Foreign Application Priority Data

Jun. 23, 2022 (TW) .................................. 111123533

(51) Int. Cl.
*H01Q 3/40* (2006.01)

(52) U.S. Cl.
CPC ..................................... *H01Q 3/40* (2013.01)

(58) Field of Classification Search
CPC ........ H01Q 21/29; H01Q 3/26; H01Q 21/061; H01Q 23/00; H04B 7/0617
See application file for complete search history.

(56) References Cited

U.S. PATENT DOCUMENTS 8,279,116 B2 * 10/2012 Duffett-Smith ......... G01S 19/30 342/357.77
9,494,692 B2 11/2016 Leclercq et al.
10,461,417 B2 * 10/2019 Ogawa ................. H01Q 21/245
11,901,632 B2 * 2/2024 Takahashi ................ H01Q 3/36
12,040,557 B1 * 7/2024 Sharma .................... H01Q 3/38
2010/0198512 A1 * 8/2010 Zhang .................... G01C 21/26 701/530
2017/0115402 A1 4/2017 Leclercq et al.
2020/0328511 A1 * 10/2020 Zimmerman ......... H04W 16/28
2023/0420844 A1 * 12/2023 Chen ........................ H01Q 3/40

FOREIGN PATENT DOCUMENTS

| | | | |
|---|---|---|---|
| CN | 102023303 | A | 4/2011 |
| CN | 101084453 | B | 12/2011 |
| CN | 102037377 | B | 3/2014 |
| CN | 104049264 | A | 9/2014 |
| CN | 104471440 | B | 8/2016 |
| CN | 110824513 | A | 2/2020 |
| EP | 2093584 | B1 | 3/2011 |
| EP | 3353906 | B1 | 7/2020 |
| WO | 2010123603 | A1 | 10/2010 |

* cited by examiner

*Primary Examiner* — Jaison Joseph
(74) *Attorney, Agent, or Firm* — MUNCY, GEISSLER, OLDS & LOWE, P.C.

(57) ABSTRACT

An antenna device includes a substrate and a plurality of antenna elements arranged in an array. The substrate has a driving circuit. The driving circuit defines a frame rate N and a refresh time, wherein the sum of N refresh times is 1 second. The antenna elements are arranged on the substrate and are electrically connected to the driving circuit. The antenna elements jointly define a beamforming in each refresh time (1/N second), and the beamforming defines a signal, which includes a carrier frequency that is not less than 10 GHz and a characteristic information for communicating with a satellite. M consecutive beamformings contain two or more kinds of the characteristic information, wherein M is an integer not greater than 20.

12 Claims, 5 Drawing Sheets

ANTENNA DEVICE

CROSS REFERENCE TO RELATED APPLICATIONS

This Non-provisional application claims priority under 35 U.S.C. § 119(a) on Patent Application No(s). 111123533 filed in Taiwan, Republic of China on Jun. 23, 2022, the entire contents of which are hereby incorporated by reference.

BACKGROUND

Technology Field

This disclosure relates to a device and, in particular, to an antenna device with the advantages of more accurate orientation and faster data transmission.

DESCRIPTION OF RELATED ART

As the improvement of communication technology, the applications of communication technology in technology products have been increasing, thereby making related communication products more diversified. Particularly, in recent years, the consumer's requirements for the functions of communication products have become higher, so many communication products with different designs and functions have been continuously proposed. Electronic products with wireless communication function are a hot trend recently. In addition, the technology of integrated circuit is more and more mature, which makes the size of products tends to be lighter, thinner and smaller.

In communication products, antennas used in electronic devices with wireless communication function must have the characteristics of small size, good performance and low cost in order to be widely accepted and affirmed by the market. Among various antennas, phased array antennas use electric orientation mechanism, which has many advantages over traditional mechanical orientation antennas, such as lower height or smaller size, better long-term reliability, fast orientation, more beams, etc. With these advantages, phased array antennas have been widely used in many applications such as military applications, satellite communications, and 5G telecommunications (including Internet of Vehicles (IoV)).

The phased array antenna is a group of antenna elements assembled together such that the radiation pattern of each antenna element is structurally combined with the radiation patterns of adjacent antennas to form an effective radiation pattern, which is named as the main lobe. The main lobe emits radiation energy at the desired position, and the antenna, based on the design, is responsible for destructively interfering with signals in unwanted directions so as to create null signals and side lobes. The antenna array is designed to maximize the energy radiated from the main lobe while reducing the energy radiated from the side lobes to acceptable levels, and the radiation direction can be controlled by changing the phase of the signal fed to each antenna element so as to track satellite for transmitting or receiving signals.

SUMMARY

One or more exemplary embodiments of this disclosure are to provide an antenna device having the advantages of more accurate orientation and faster data transmission speed.

An antenna device of this disclosure includes a substrate and a plurality of antenna elements. The substrate has a driving circuit, which defines a frame rate N and a refresh time, wherein a sum of N refresh times is 1 second. The antenna elements are arranged on the substrate and are electrically connected to the driving circuit. The antenna elements jointly define a beamforming in each refresh time, and the beamforming defines a signal. The signal includes a carrier frequency that is not less than 10 GHz and a characteristic information for communicating with a satellite. M consecutive beamformings contain two or more kinds of the characteristic information, and M is an integer not greater than 20.

In one exemplary embodiment, the M consecutive beamformings contain a plurality of the characteristic information, and M is an integer less than 20.

In one exemplary embodiment, M is an integer not greater than 10.

In one exemplary embodiment, the frame rate N is a multiple of 30 Hz.

In one exemplary embodiment, the carrier frequency is not greater than 60 GHz.

In one exemplary embodiment, the carrier frequency is not greater than 30 GHz.

In one exemplary embodiment, the antenna device further includes a plurality of circuitry elements arranged corresponding to the antenna elements in a one-to-one manner or a one-to-multiple manner.

As mentioned above, in the antenna device of this disclosure, the antenna elements arranged in array jointly define a beamforming in each refresh time, the beamforming defines a signal, and the signal includes a carrier frequency that is not less than 10 GHz and one characteristic information for communicating with a satellite. M consecutive beamformings contain two or more kinds of characteristic information, and M is an integer not greater than 20. Accordingly, the antenna device of this disclosure can track different satellites at different refresh times, and track multiple satellites at multiple refresh times. Therefore, this antenna device has the advantages of more accurate orientation and faster data transmission speed.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements. The drawings of the following embodiments only illustrate the relative relationship between elements or units, and do not represent the actual size or proportion of the elements or units.

The antenna device of this disclosure can be an Active Matrix (AM) antenna device or a Passive Matrix (PM) antenna device, and this disclosure is not limited thereto. The antenna device in the following embodiments is a phased array antenna device for an example.

Figure 1:
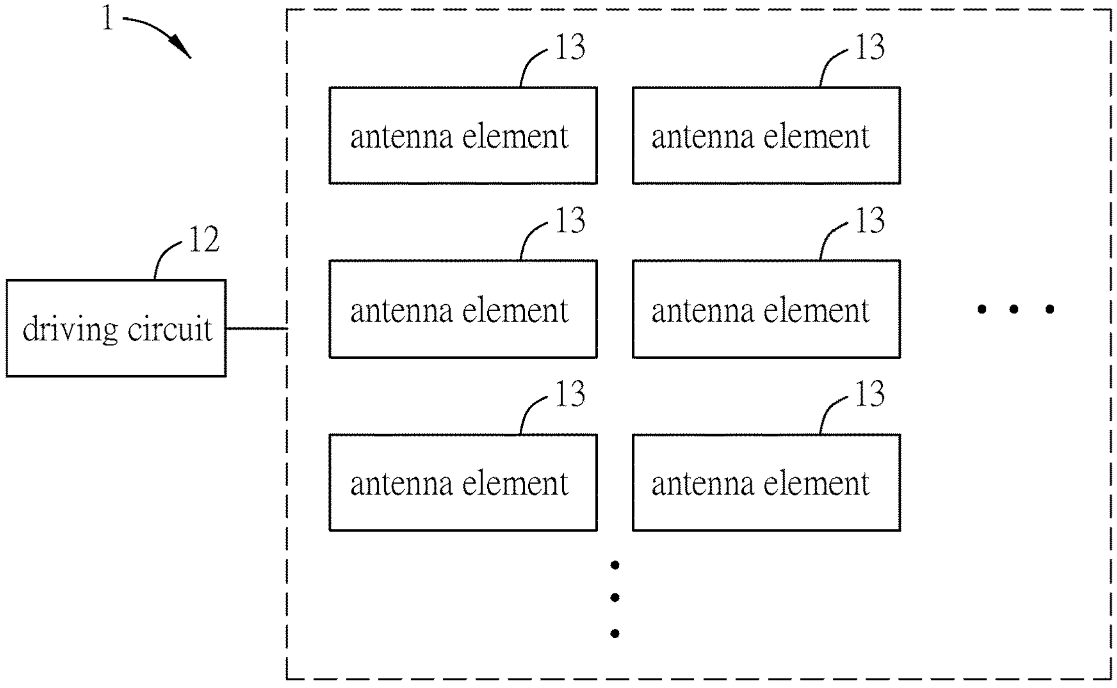
FIG. 1 is a block diagram of an antenna device according to an embodiment of this disclosure.
Figure 2:
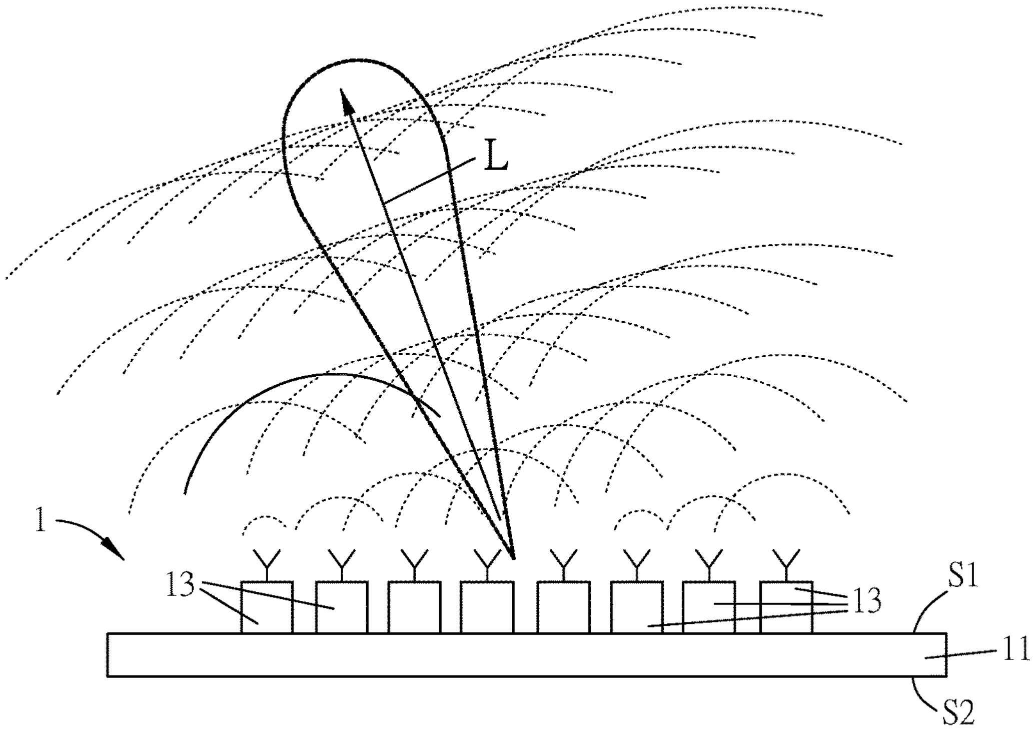
FIG. 2 is a schematic diagram showing the radiation pattern of the antenna device according to an embodiment of this disclosure.
Figure 3A:
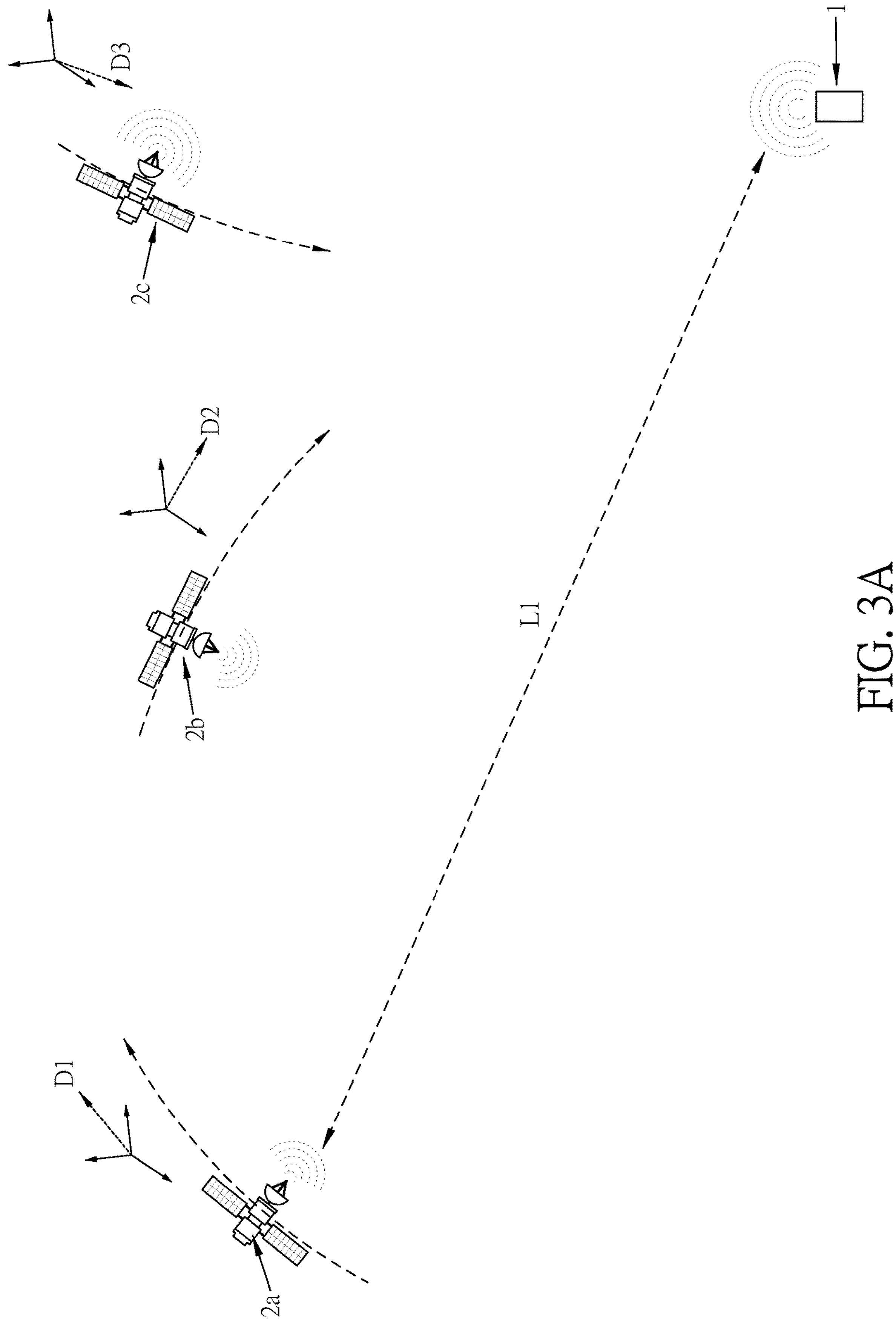
FIGS. 3A to 3C are schematic diagrams showing that the antenna device tracks different satellites at different refresh times.
Figure 3B:
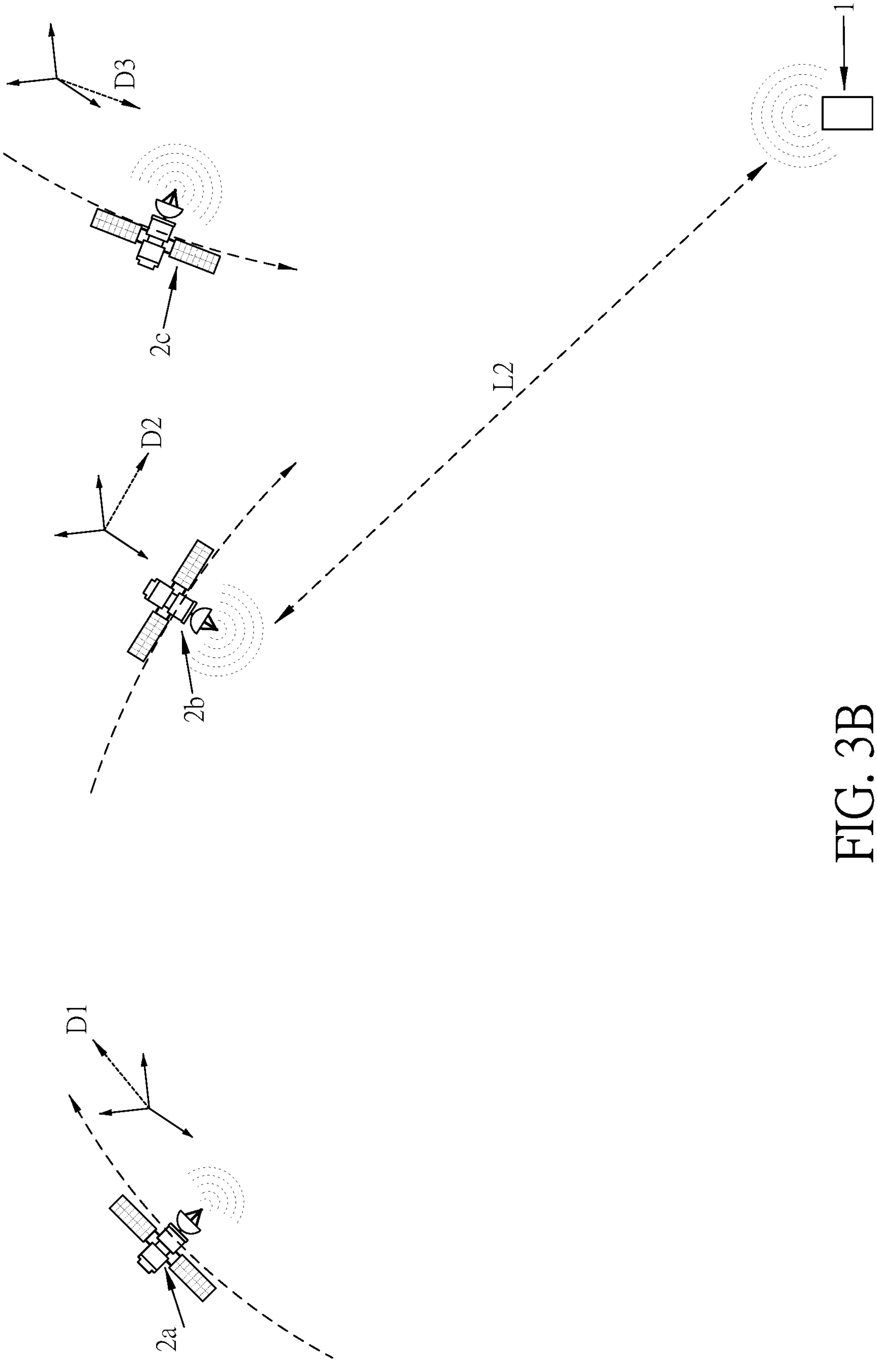
Figure 3C:
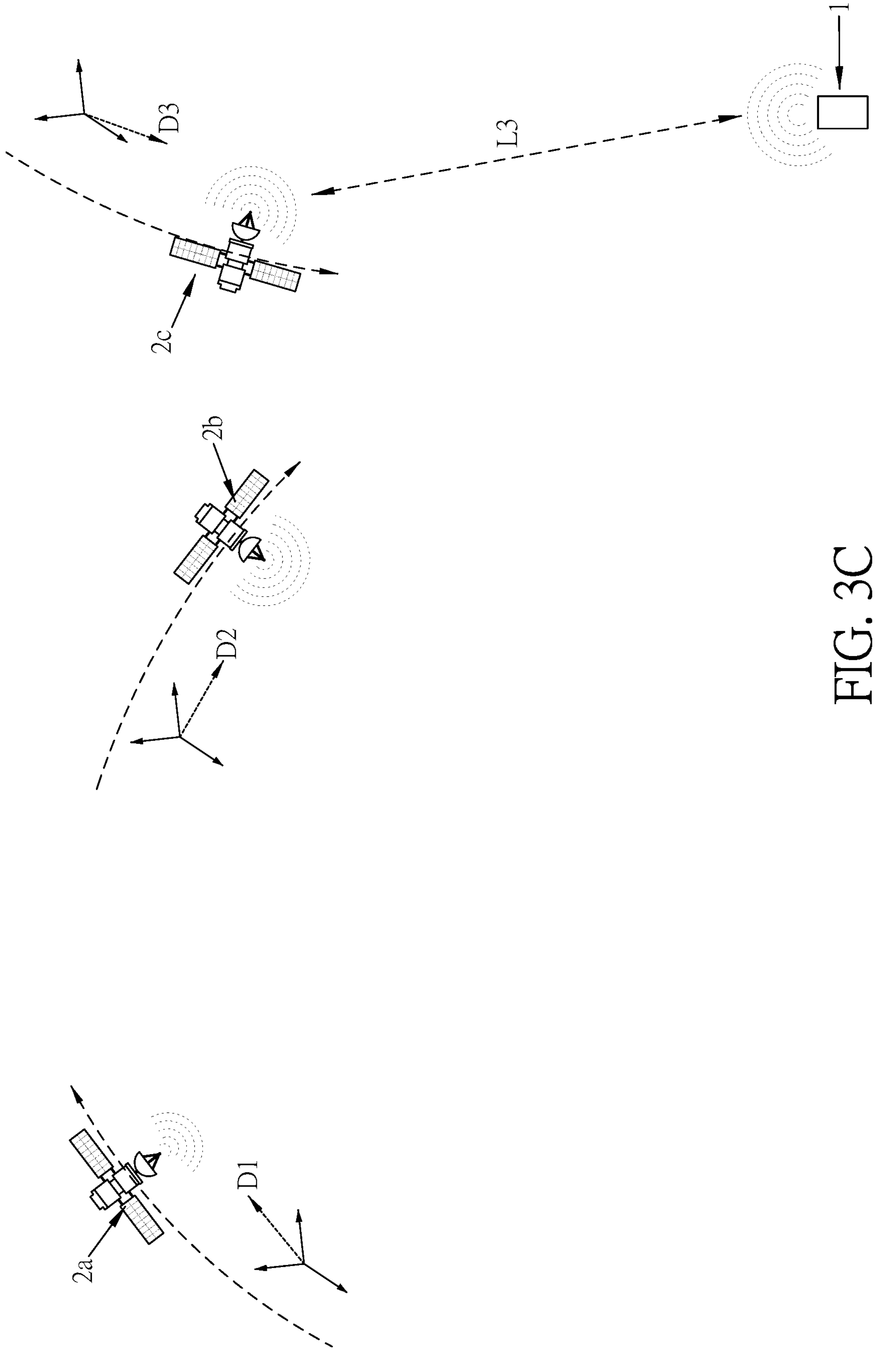
Figure 4:
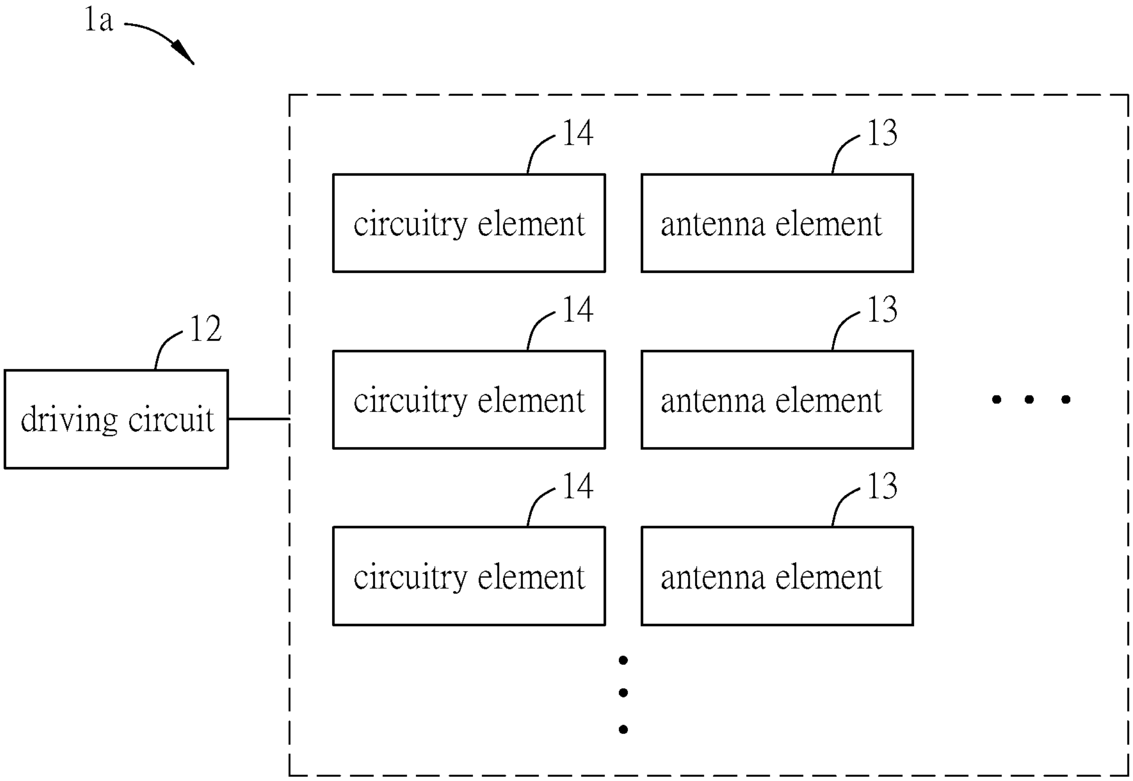
FIG. 4 is a block diagram of an antenna device according to another embodiment of this disclosure.

FIG. 1 is a block diagram of an antenna device according to an embodiment of this disclosure, FIG. 2 is a schematic diagram showing the radiation pattern of the antenna device according to an embodiment of this disclosure, FIGS. 3A to 3C are schematic diagrams showing that the antenna device tracks different satellites at different refresh times, and FIG. 4 is a block diagram of an antenna device according to another embodiment of this disclosure.

Referring to FIGS. 1 and 2, the antenna device 1 of this embodiment includes a substrate 11 and a plurality of antenna elements 13.

The substrate 11 is defined with a first surface S1 and a second surface S2 opposite to each other. The substrate 11 can be a single-layer substrate, a multi-layer substrate, or a combination of multiple heterogeneous substrates. In addition, the substrate 11 can be a rigid board (a rigid substrate structure), a resilient board (a resilient substrate structure), or a composite board including rigid and resilient boards. For example, the substrate 11 can be a glass substrate, a polytetrafluoroethylene (PTFE) substrate, a ceramic substrate, a polyimide (PI) substrate, or a substrate made of a composite material containing any of the above-mentioned materials. To be noted, the hardness of the board is relative to the resilient board. In some embodiments, the substrate 11 defines a thickness d, which is greater than or equal to mm and less than or equal to 1.1 mm (0.01 mm≤d≤1.1 mm). For example, the thickness d can be 0.01 mm, 0.5 mm, 1.1 mm, or any of other suitable dimensions.

The substrate 11 has a driving circuit 12, which defines a frame rate N and a refresh time (1/N second), wherein a sum of N refresh times is 1 second. In addition, the antenna elements 13 are arranged on the first surface S1 of the substrate 11 and are electrically connected to the driving circuit 12. In this embodiment, the antenna elements 13 can be, for example but not limited to, phased array antennas arranged in a two-dimensional array. Specifically, the driving circuit 12 can transmit N of electric signals in one second to these antenna elements 13 (each refresh time is 1/N second), and the antenna elements 13 can transmit a corresponding (RF) signal to the satellite according to each of the electric signals. In addition, the antenna elements 13 can receive the signal from the satellite, and then transmit the received satellite signal to the driving circuit 12. In some embodiments, the frame rate N is a positive integer greater than 0, and it can be a multiple of 30 Hz such as, for example but not limited to, 30 Hz, 60 Hz, 90 Hz, 120 Hz, 180 Hz, 240 Hz, or the likes. For example, if the frame rate N is 60 Hz, the driving circuit 12 can output 60 times of electric signals in one second to the antenna elements 13 (each refresh time is 1/60 second). Then, the antenna elements 13 can transmit a corresponding RF signal to the satellite every 1/60 second according to the electric signal so as to communicate with the satellite.

Referring to FIG. 2, the antenna elements 13 jointly define a beamforming L in each refresh time (1/N second), and the beamforming L defines a signal. The signal includes a carrier frequency that is not less than 10 GHz and a characteristic information for communicating with a satellite. Herein, M consecutive beamformings L contain two or more kinds of the characteristic information for identifying different satellites. In some embodiments, M is an integer not greater than 20 (i.e., less than or equal to 20). Specifically, the driving circuit 12 can control the phase of the radiation signal emitted by each antenna element 13 in every refresh time (1/N second), so that the multiple radiation signals of the antenna elements 13 form constructive interference in a certain direction and form destructive interference in other directions, thereby jointly forming a beamforming L pointing in a certain direction (a certain angle) in each refresh time (1/N second). Therefore, in one refresh time (1/N second), the beamforming L formed by all antenna elements 13 only communicates with one satellite. Moreover, less than or equal to 20 consecutive beamformings L (i.e., in less than or equal to 20 consecutive refresh times (20/N seconds)) may contain two or more kinds of characteristic information, and the two or more kinds of characteristic information can identify two or more different satellites. In different embodiments, M consecutive beamformings may contain multiple kinds of characteristic information; in different embodiments, M can be an integer less than 20. In some embodiments, M can be a positive integer not greater than 10. In some embodiments, the carrier frequency can be not greater than 60 GHz (i.e., 10 GHz≤the carrier frequency≤60 GHz). In some embodiments, the carrier frequency can be not greater than 30 GHz (i.e., 10 GHz≤the carrier frequency≤30 GHz). In some embodiments, the carrier frequency can be, for example but not limited to, 12 GHz or 28.8 GHz.

For the sake of clarity, the embodiment of FIG. 3A to FIG. 3C shows three consecutive beamformings L1, L2 and L3, which contain three kinds of characteristic information, for tracking three different satellites 2*a*, 2*b* and 2*c* in different and consecutive refresh times. For example, the antenna elements 13 of the antenna device 1 can form the first beamforming L1 in the first refresh time (1/N second), form the second beamforming L2 in the second refresh time (1/N second), form the third beamforming L3 in a third refresh time (1/N second), and so on. The beamformings L1, L2 and L3 can have different angles, and can contain different kinds of characteristic information for tracking different satellites. In this embodiment, each signal defined by each beamforming L1, L2 or L3 is an RF signal, and the RF signal has a carrier frequency greater than or equal to 10 GHz (the carrier signal is used to carry information to be transmitted). In addition, in order to communicate with a specific satellite, each of the satellites 2*a*, 2*b* and 2*c* has a specific and unique characteristic information. Therefore, when receiving the RF signal, the satellite 2*a*, 2*b* or 2*c* can determine that whether the antenna device 1 wants to build a communication with it.

For example, the satellite 2*a* has a first characteristic information, the satellite 2*b* has a second characteristic information, and the satellite 2*c* has a third characteristic information. After the antenna device 1 scans over the available satellites 2*a*, 2*b* and 2*c*, the antenna device 1 can identify the first, second, and third characteristic information corresponding to the satellites 2*a*, 2*b* and 2*c*, and the satellites 2*a*, 2*b* and 2*c* can establish tracking relationships with the antenna device 1. That is, these satellites 2*a*, 2*b* and 2*c* can determine that they can communicate with the antenna device 1. After obtaining the first, second, and third characteristic information, the antenna device 1 can predict the moving routes of the satellites 2*a*, 2*b* and 2*c*, and can calculate the phase information of the antenna elements 13 corresponding to the next refresh time or multiple subsequent refresh times. Since the antenna device 1 has already obtained the characteristic information of multiple satellites before tracking the satellites, the steps of rescanning the satellites and identifying specific satellites for switching to a different satellite can be omitted. The omitted step refers to the multiple consecutive refresh times (each refresh time is 1/N second). In general, there are more than 20 of consecutive refresh times referring to the omitted step. In other words, the antenna device 1 can track and switch to two or more satellites at least within M refresh times (each refresh time is 1/N second). It can be understood that the moving routes of the satellites 2*a*, 2*b* and 2*c* can be different. For example, the moving directions (e.g. D1, D2 and D3 in FIG. 3A) and the moving routes of the satellites 2*a*, 2*b* and 2*c* along at least one coordinate axis in Cartesian coordinate system are not parallel to each other.

In some embodiments, if the frame rate N is, for example, equal to 60 Hz, the antenna device 1 can track and communicate with the satellite 2*a* based on the first characteristic information in the first 1/60 second, then the antenna device 1 can track and communicate with the satellite 2*b* based on the second characteristic information in the second 1/60 second, and then the antenna device 1 can track and communicate with the satellite 2*c* based on the third characteristic information in the third 1/60 second. Moreover, the antenna device 1 can track and communicate with the satellite 2*a* based on the first characteristic information in the fourth 1/60 second, then the antenna device 1 can track and communicate with the satellite 2*b* based on the second characteristic information in the fifth 1/60 second, and so on. To be noted, the above case is an example of tracking 3 satellites, but this disclosure is not limited thereto. In different embodiments, the antenna device 1 can transmit multiple consecutive beamformings L, which respectively contain different characteristic information, to track different satellites. Therefore, the antenna device 1 of this embodiment can track different satellites at different refresh times, and track multiple satellites at multiple refresh times, thereby having the advantages of more accurate orientation and faster data transmission speed.

With reference to FIG. 4, unlike the above-mentioned antenna device 1, the antenna device 1*a* of this embodiment further includes a plurality of circuitry elements 14, which are arranged on the first surface S1 or the second surface S2 of the substrate 11. The circuitry elements 14 of the antenna device 1*a* are arranged corresponding to the antenna elements 13 in a one-to-one manner or a one-to-multiple manner. In this embodiment, the circuitry elements 14 are, for example, arranged corresponding to the antenna elements 13 in a one-to-one manner. Accordingly, the electric signals outputted from the driving circuit 12 can be transmitted through the circuitry elements 14 to drive the corresponding antenna elements 13 to emit the RF signals.

In some embodiments, each circuitry element 14 can include at least one electronic component, and the electronic component can include a power amplifier (PA), a low noise amplifier (LNA), a varactor, or a passive component, or any combination thereof. In some embodiments, one or more electronic components can be high frequency components. In this case, "high frequency" can be defined as the frequency range between 3 MHz and hundreds of GHz. In some embodiments, electronic components can include a power amplifier or/and a low noise amplifier, which is made of materials such as, for example but not limited to, gallium arsenide (GaAs), gallium nitride (GaN), phosphorus indium (InP) or any combination thereof. In some embodiments, one or more electronic components can be a passive component such as a resistor-inductor-capacitor (RLC) circuit. In some embodiments, one or more electronic components can be a flip-chip component (i.e., a surface mount device (SMD)). In some embodiments, one or more electronic components can be a thin-film component made by a thin-film process, such as a thin-film transistor (TFT). The thin-film process can be any of semiconductor processes, such as a low-temperature polysilicon (LTPS) process, a high-temperature polysilicon (HTPS) process, a low-temperature polycrystalline oxide (LTPO) process, or an indium-gallium-zinc oxide (IGZO) process. In some embodiments, one or more electronic components can be a driving integrated circuit (driving IC), such as the silicon or non-silicon IC, and the types or kinds of the electronic components are not limited in this disclosure.

In addition, the driving circuit 12 of this embodiment can further include a memory unit, which can store a plurality of characteristic information for communicating with a plurality of satellites. In this embodiment, two or more kinds of the characteristic information can be contained by the beamformings respectively. The memory unit can be a non-transitory computer readable storage medium such as, for example but not limited to, at least a memory, a memory card, a memory chip, an optical disc, a computer magnetic tape, or any combination thereof. In some embodiments, the aforementioned memory can include a read-only memory (ROM), a flash memory (Flash), a field-programmable gate array (FPGA), or solid state disk (SSD), or any of other types of memories, or any combination thereof.

In summary, in the antenna device of this disclosure, the antenna elements arranged in array jointly define a beamforming in each refresh time (1/N second), the beamforming defines a signal, and the signal includes a carrier frequency that is not less than 10 GHz and one characteristic information for communicating with a satellite. M consecutive beamformings contain two or more kinds of characteristic information, and M is an integer not greater than 20. Accordingly, the antenna device of this disclosure can track different satellites at different refresh times, and track multiple satellites at multiple refresh times. Therefore, this antenna device has the advantages of more accurate orientation and faster data transmission speed.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An antenna device, comprising:

a substrate having a driving circuit, wherein the driving circuit defines a refresh time, a sum of N of the refresh times is 1 second, and N represents a frame rate; and a plurality of antenna elements arranged in an array, wherein the antenna elements are arranged on the substrate and are electrically connected to the driving circuit, the antenna elements jointly define a beamforming in each of the refresh times, the beamforming defines a signal, and the signal comprises a carrier frequency that is not less than 10 GHz and a characteristic information for communicating with a satellite;

wherein, consecutive M of the beamformings contain two or more kinds of the characteristic information, and M is an integer not greater than 20.

2. The antenna device of claim 1, wherein the consecutive M of the beamformings contain a plurality of the characteristic information, and M is an integer less than 20.

3. The antenna device of claim 2, wherein M is an integer not greater than 10.

4. The antenna device of claim 1, wherein the frame rate N is a multiple of 30 Hz.

5. The antenna device of claim 1, wherein the carrier frequency is not greater than GHz.

6. The antenna device of claim 1, wherein the carrier frequency is not greater than 30 GHz.

7. The antenna device of claim 1, further comprising:

a plurality of circuitry elements arranged corresponding to the antenna elements in a one-to-one manner or a one-to-multiple manner.

8. The antenna device of claim 7, wherein each of the circuitry elements comprises at least one circuit or electronic component, and the circuit or the electronic component at least comprise a power amplifier (PA), a low noise amplifier (LNA), a varactor, or a passive component, or any combination thereof.

9. The antenna device of claim 1, wherein the driving circuit further comprises:

a memory unit for storing the characteristic information.

10. The antenna device of claim 1, wherein the antenna elements are phased array antennas arranged in a two-dimensional array.

11. The antenna device of claim 1, wherein the beam-forming formed by the antenna elements in each of the refresh times communicates with single one of the satellites.

12. The antenna device of claim 1, wherein the antenna device is an Active Matrix (AM) antenna device or a Passive Matrix (PM) antenna device.

* * * * *